(12) United States Patent
Kim et al.

(10) Patent No.: US 12,705,479 B2
(45) Date of Patent: Aug. 11, 2026

(54) RENEWABLE ENERGY ERROR COMPENSABLE FORCASTING METHOD USING BATTERY

(71) Applicant: SOGANG UNIVERSITY RESEARCH & BUSINESS DEVELOPMENT FOUNDATION, Seoul (KR)

(72) Inventors: Hongseok Kim, Seoul (KR); Jaeik Jeong, Seoul (KR)

(73) Assignee: SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 1021 days.

(21) Appl. No.: 17/703,126

(22) Filed: Mar. 24, 2022

(65) Prior Publication Data

US 2022/0309346 A1 Sep. 29, 2022

(30) Foreign Application Priority Data

Mar. 25, 2021 (KR) ........................ 10-2021-0038927

(51) Int. Cl.
*G06N 3/08* (2023.01)
*H02J 3/00* (2006.01)
(Continued)

(52) U.S. Cl.
CPC ................ *G06N 3/08* (2013.01); *H02J 3/004* (2020.01); *H02J 3/32* (2013.01); *H02J 3/381* (2013.01);
(Continued)

(58) Field of Classification Search
CPC .......... G06N 3/08; G06N 3/044; G06N 3/045; G06N 3/006; G06N 7/01; G06N 3/092;
(Continued)

(56) References Cited

U.S. PATENT DOCUMENTS 11,009,536 B2 * 5/2021 Borean .................. G06N 3/044
11,522,487 B2 * 12/2022 Dong ...................... H02S 10/20
(Continued)

FOREIGN PATENT DOCUMENTS

JP 2017-022975 1/2017
KR 10-1761686 7/2017
(Continued)

OTHER PUBLICATIONS

John Schulman et al. "Proximal policy optimization algorithms." arXiv preprint arXiv:1707.06347 (2017).
(Continued)

*Primary Examiner* — Manuel A Rivera Vargas
(74) *Attorney, Agent, or Firm* — LEX IP MEISTER, PLLC

(57) ABSTRACT

A renewable energy error compensable forecasting method using a battery is provided.
The method may include modeling a policy $\pi_\theta$ with a parameter θ, by using a reinforcement learning algorithm in which a state $s_t$ of an agent in a time zone t and, a reward $r_{t+1}$ in a time zone t+1 and a next state $s_{t+1}$ with respect to an action $\alpha_t$ taken by the agent are determined; determining the parameter θ capable of minimizing a sum of an error function $$f_{t+1}^D;$$

and generating a compensable error with the battery using a model including the parameter θ.

10 Claims, 9 Drawing Sheets

(51) Int. Cl.
*H02J 3/32* (2006.01)
*H02J 3/38* (2006.01)
*H02J 7/00* (2006.01)

(52) U.S. Cl.
CPC ......... *H02J 7/0068* (2013.01); *H02J 2203/20* (2020.01); *H02J 2300/24* (2020.01); *H02J 2300/28* (2020.01)

(58) Field of Classification Search
CPC .... H02J 3/004; H02J 3/32; H02J 3/381; H02J 7/0068; H02J 2203/20; H02J 2300/24; H02J 2300/28; H02J 7/0071; H02J 2300/20; Y04S 10/50; Y04S 10/12; G06F 17/10
See application file for complete search history.

(56) References Cited

U.S. PATENT DOCUMENTS 11,657,302 B2 * 5/2023 Dasgupta ............... G06Q 10/04 706/13
2014/0347016 A1 * 11/2014 Becker ...................... H02J 3/32 320/136
2015/0186904 A1 * 7/2015 Guha ............... G06Q 10/06316 705/7.26
2020/0059098 A1 * 2/2020 Dong ..................... G06Q 50/06
2021/0150384 A1 * 5/2021 Dasgupta ................. G06N 5/04
2022/0012609 A1 * 1/2022 Gormally ............... G06Q 10/04

FOREIGN PATENT DOCUMENTS

KR 10-2017-0136357 12/2017
KR 10-2019-0030074 3/2019
KR 10-2062892 1/2020
KR 10-2020-0022947 3/2020
KR 10-2088532 3/2020

OTHER PUBLICATIONS

Jeong Jaeik et al., "Deep Reinforcement Learning based Renewable Energy Error Compensable Forecasting", Proceedings of Symposium of the Korean Institute of communications and Information Sciences, Nov. 13, 2020, total 4 pages.
KIPO, Office Action of KR 10-2021-0038927 dated Jul. 4, 2025, total 7 pages.

* cited by examiner

RENEWABLE ENERGY ERROR COMPENSABLE FORCASTING METHOD USING BATTERY

CROSS-REFERENCE TO RELATED APPLICATION

This application claims priority to and the benefit of Korean Patent Application No. 10-2021-0038927 filed in the Korean Intellectual Property Office on Mar. 25, 2021, the entire contents of which are incorporated herein by reference.

BACKGROUND OF THE DISCLOSURE

(a) Field of the Disclosure

The present disclosure relates to a renewable energy error-compensable forecasting method using a battery.

(b) Description of the Related Art

A common goal of the existing renewable energy forecasting algorithm was to reduce an error between a measured value and a forecasted value as much as possible. In particular, it is known that using long short-term memory (LSTM), which is one of deep neural networks (DNNs), may significantly reduce forecasting errors. Since the goal is to reduce the error between the measured value and the forecasted value, an objective function uses the mean absolute error (MAE) or the mean squared error (MSE). In order to reduce the forecasting error, a new utilization method of historical data or a new LSTM structure was invented, but only MAE or MSE was always used as the objective function.

However, reducing the error does not mean making a compensable error. For example, when a battery is in a fully discharged state, since discharging is impossible at all, over-forecasting is not allowed at all. Meanwhile, under-forecasting is allowed to some extent. Similarly, when the battery is in a fully charged state, under-forecasting is not allowed at all and over-forecasting is allowed to some extent. That is, it is very important whether the forecasting error is positive or negative depending on the current battery state. However, MAE and MSE, which are the existing used objective functions, did not consider a sign of the forecasting error at all, and focused only on reducing the error between the measured value and the forecasted value.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a renewable energy error compensable forecasting method using a battery having advantages of ultimately reducing an error (a dispatched error) between a forecasted value and a dispatch value sent to a power grid, by changing a goal of renewable energy forecasting from reducing the error between the measured value and the forecasted value to making a compensable error using the battery.

An embodiment of the present disclosure provides a renewable energy error compensable forecasting method using a battery including modeling a policy $\pi_\theta$ with a parameter θ, by using a reinforcement learning algorithm in which a state $s_t$ of an agent in a time zone t and, a reward $r_{t+1}$ in a time zone t+1 and a next state $s_{t+}1$ with respect to an action at taken by the agent are determined; determining the parameter θ capable of minimizing a sum of an error function $$f_{t+1}^D;$$

and generating a compensable error with the battery using a model including the parameter θ.

In some embodiments of the present disclosure, the method may further include charging the battery by the compensable error in case of under-forecasting.

In some embodiments of the present disclosure, the method may further include discharging the battery by the compensable error in case of over-forecasting.

In some embodiments of the present disclosure, the state $s_t$ may be determined using Equation 1 below, $$s_t = (o_0, o_1, \ldots, o_t) \quad \text{[Equation 1]}$$

(here, $o_t$ denotes an observed value in the time zone t.)

In some embodiments of the present disclosure, the observed value $o_t$ may be determined using Equation 2 below, $$o_t = (x_t, E_t) \quad \text{[Equation 2]}$$

(here, $x_t$ denotes a measured value of renewable energy generation amount in the time zone t, and $E_t$ denotes energy stored in the battery.)

In some embodiments of the present disclosure, the reward $r_{t\div1}$ may be determined using Equation 3 below, $$r_{t+1} = -f_{t+1}^D$$

(here, $$f_{t+1}^D$$

denotes an error function.)

In some embodiments of the present disclosure, an objective function of the reinforcement learning algorithm is determined using Equation 4 below,

[Equation 4]

$$\underset{\{a_t\}_{t=0}^{\infty}}{\text{minimize}}\ \mathbb{E}_{\{x_{t+1}\}_{t=0}^{\infty}}\left[\sum_{t=0}^{\infty}\gamma^t f_{t+1}^D\right] = \underset{\theta}{\text{maximize}}\ \mathbb{E}_{\{x_{t+1},a_t\}_{t=0}^{\infty}}\left[\sum_{t=0}^{\infty}\gamma^t r_{t+1}\right]$$

(here, $$\{a_t\}_{t=0}^{\infty}$$

denotes a forecasted value capable of minimizing the sum of the error function $$f_{t+1}^{D},$$

$\gamma$ denotes a depreciation ($0<\gamma<1$), and $$\{x_{t+1}\}_{t=0}^{\infty}$$

denotes a future renewable energy generation amount.)

In some embodiments of the present disclosure, the action at is extracted from $\pi_{0}(\cdot|s_t)$ corresponding to the policy in the state $s_t$.

In some embodiments of the present disclosure, the reinforcement learning algorithm may be implemented using an artificial neural network model.

In some embodiments of the present disclosure, the artificial neural network model updates the parameter $\theta$ by using a value function $V_{\theta}(s_t)$ estimated from the state $s_t$ of the agent in the time zone t.

A battery, which is a device used to alleviate uncertainty and volatility in renewable energy, serves to compensate for the error by discharging the battery by the error when the forecasted value is greater than the measured value (over-forecasting) and charging the battery by the error when the forecasted value is smaller than the measured value (under-forecasting). At this time, since there is a limit to the capacity of the battery, in the conventional art, it was to prevent the case where the error could not be corrected by minimizing the error as much as possible. However, just as over-forecasting is not allowed at all but under-forecasting is allowed to some extent when the battery is in a fully discharged state, reducing the error does not make the error compensation better.

According to the embodiments of the present disclosure, an algorithm that ultimately minimizes the error (the dispatched error) between the forecasted value and the dispatch value sent to the power grid, by switching the goal of renewable energy forecasting from reducing the error to making the compensable error was adopted, and is an algorithm that requires interaction with the battery unlike the existing forecasting, and thus the existing deep learning-based forecasting was extended to a deep reinforcement learning-based forecasting for continuous value control, thereby showing the possibility of implementing error compensable forecasting.

Amid the flow of technology that attempt to mitigate the uncertainty and volatility of renewable energy through the battery, there has been no movement to attempt forecasting that makes the "compensable error" through the battery. From the point of view of a power grid operator, since a fatal error for a stable power grid operation is not the error between the measured value and the forecasted value, but the error (the dispatched error) between the dispatch value sent to the power grid and the forecasted value, the forecasting error compensation is very important. There is an advantageous effect of greatly reducing the dispatched error finally by making the forecasting error compensable, rather than simply reducing the forecasting error as in the conventional art.

In addition, the embodiments of the present disclosure additionally apply only the reinforcement learning algorithm that allows interaction with the battery while utilizing the conventional deep learning structure that greatly reduces the forecasting error, which means that, while absorbing the advantages of the conventional art as it is, it is possible to secure the possibility and ease of implementing the error compensable forecasting.

DETAILED DESCRIPTION OF THE EMBODIMENTS

Figure 1:
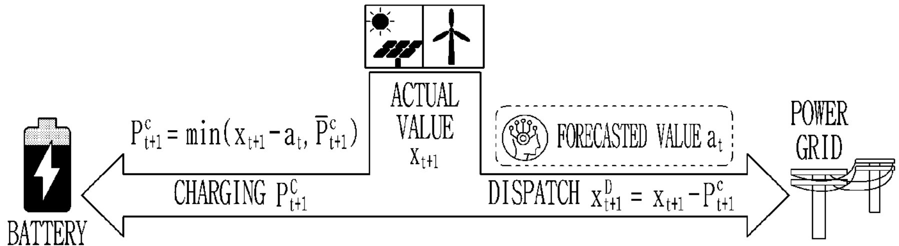
FIGS. 1 and 2 are diagrams for explaining a battery operating method.

Hereinafter, with reference to the accompanying drawings, the embodiments of the present disclosure will be described in detail so that those of ordinary skill in the art to which the present disclosure pertains may easily implement them.

However, the present disclosure may be embodied in several different forms and is not limited to the embodiments described herein. In addition, in order to clearly explain the present disclosure in the drawings, parts irrelevant to the description are omitted, and like reference numerals designate like elements throughout the specification.

In addition, throughout the specification and the claims, unless explicitly described to the contrary, the word "comprise", and variations such as "comprises" or "comprising", will be understood to imply the inclusion of stated elements but not the exclusion of any other elements. In addition, the terms such as " . . . part", " . . . er (or)", and "module" described in the specification refer to a unit that processes at least one function or operation, which may be implemented as hardware or software or a combination of hardware and software. In addition, the renewable energy error compensable forecasting method using a battery according to the embodiments described below may be implemented as a program or software, and the program or software may be stored in a computer-readable medium.

Table 1 shows parameters used in an error compensable forecasting model used in an embodiment of the present disclosure.

TABLE 1

| | |
|---|---|
| t | Discrete time slot index |
| $x_t$ | Real renewable power generation value |
| $a_t$ | Forecasted value in next time slot t + 1 |
| $E_t$ | Stored energy in the battery |
| $E_{max}$ | Maximum Battery Capacity |
| $SoC_{min}/SoC_{max}$ | Minimum/Maximum state-of-charge of the battery |
| $P^{c}{t+1} / P^{d}_{t+1}$ | Charging/Discharging power of the battery |
| $\overline{P}^{c}_{t+1} / \overline{P}^{d}_{t+1}$ | Charging/Discharging power limitation |
| $P^{c}_{max} / P^{d}_{max}$ | Maximum charging/discharging power of the battery |
| $\eta_c/\eta_d$ | Charging/Discharging efficiency |
| $\beta_c/\beta_d$ | Penalty coefficient of charging/discharging power |
| $\gamma$ | Discount factor |
| $x_t^D$ | Dispatched power to the grid |
| $e_t^D$ | Dispatched error |
| $f_t^D$ | Error function |

The problem to be solved in the error compensable forecasting model used in an embodiment of the present disclosure may be defined as follows.

$$\underset{\{a_t\}_{t=0}^{\infty}}{\text{minimize}}\ \mathbb{E}_{\{x_{t+1}\}_{t=0}^{\infty}}\left[\sum_{t=0}^{\infty}\gamma^t f_{t+1}^D\right] \tag{1}$$

subject to $$\overline{P}^{c}_{t+1} = \min\left(P^{c}_{max},\ \frac{1}{\eta_c}\times\frac{E_{max}\times SoC_{max}-E_t}{\Delta t}\right) \tag{2a}$$

$$\overline{P}^{d}_{t+1} = \min\left(P^{d}_{max},\ \eta_d\times\frac{E_t-E_{max}\times SoC_{max}}{\Delta t}\right) \tag{2b}$$

$$P^{c}_{t+1} = \min\left(\max(x_{t+1}-a_t,\ 0),\ \overline{P}^{c}_{t+1}\right) \tag{3a}$$

$$P^{d}_{t+1} = \min\left(\max(a_t-x_{t+1},\ 0),\ \overline{P}^{d}_{t+1}\right) \tag{3b}$$

$$E_{t+1} = E_t + \eta_c P^{c}_{t+1}\Delta t - \frac{1}{\eta_d}P^{d}_{t+1}\Delta t \tag{4}$$

$$x_{t+1}^D = x_{t+1} - P^{c}_{t+1} + P^{d}_{t+1} \tag{5}$$

$$e_{t+1}^D = a_t - x_{t+1}^D \tag{6}$$

$$f_{t+1}^D = \left|e_{t+1}^D\right| + \beta_c P^{c}_{t+1} + \beta_d P^{d}_{t+1} \tag{7}$$

Equation (2) represents the maximum power that may be charged or discharged to the battery in a next time zone t+1 when energy stored in the battery in a time zone t is $E_t$. Deterioration of the battery is severe when a state of charge (SoC) is very high or very low. Therefore, since it is necessary to limit the SOC to be within a range ($SOC_{min}$~$SoC_{max}$) where the battery deterioration is not severe, $E_t$ must satisfy $E_{max}\times SoC_{min}\leq E_t\leq E_{max}\times SOC_{max}$. At this time, a charging/discharging efficiency ($\eta_c$, $\eta_d$) and maximum charging/discharging power $$(P^{c}_{max},\ P^{d}_{max})$$

must also be considered. Since an energy loss occurs when charging or discharging the battery, less energy is accumulated in the battery during charging and a chargeable amount increases by a ratio of $1/\eta_c$, and an amount discharged due to the energy loss decreases by a ratio of during discharging. In addition, even if the capacity remains due to the conditions of the power conversion system, it cannot be charged or discharged more than $$P^{c}_{max},\ P^{d}_{max}.$$

Accordingly, as shown in Equation (2), the maximum amount that may be charged or discharged in the next time zone t+1 is determined according to the energy $E_t$ stored in the battery in the time zone t.

Equation (3) represents the power actually charged or discharged to the battery. $x_t$ is defined as an actually measured value of a renewable energy generation amount in the time zone t, and $\alpha_t$ is defined as a forecasted value of a renewable energy generation amount in the next time zone t+1. Through this, an error in the time zone t+1 is $a_t$+$_{t+1}$. In case of under-forecasting ($a_t<x_{t+1}$), the battery is charged as much as $x_{t+1}-a_t$, but the amount of charging is limited to $$\overline{P}^{c}_{t+1}$$

as shown in Equation (2). Likewise, in case of over-forecasting ($a_t>x_{t+1}$), the battery is discharged as much as $a_t-x_{t+1}$, but the amount of charging is limited to $$\overline{P}^{d}_{t+1}.$$

Equation (4) represents a change in the energy stored in the battery. Due to the energy loss, during charging, less power is accumulated by the ratio $\eta_c$ in the charged power $$P^{c}_{t+1},$$

and during discharging, more power must be ne in the charged power discharged by the ratio $1/\eta_d$ to meet power $$P^{d}_{t+1}.$$

Unlike the other equations, Equation (4) is an equation with time-coupling in which $E_{t+1}$ is determined by $E_t$.

Equation (5) represents an amount of power actually dispatched to a power grid. Equation (5) is calculated by subtracting the amount charged to the battery from the measured value and adding the amount discharged. It may be seen that if a charge/discharge limit $$(\overline{P}^{c}_{t+1},\ \overline{P}^{d}_{t+1})$$

is not reached, $$x_{t+1}^D$$

has the same value as $a_t$.

Equation (6) represents a dispatched error, which is an error between the amount of power dispatched to the power grid and the forecasted value. From the perspective of a power grid operator, since an observed value is $$x_{t+1}^D$$

other than $x_{t+1}$, the dispatched error is much more important than the forecasting error. At this time, when the charge/discharge limit $$(\overline{P}_{t+1}^c, \overline{P}_{t+1}^d)$$

is not reached, since $$x_{t+1}^D$$

has the same value as $a_t$, the dispatched error becomes 0.

This means that it has succeeded in making a 100% compensable error.

Equation (7) represents an error function for use in an objective function of a model. First, it is important to reduce $$|e_{t+1}^D|$$

as much as possible.

$$e_{t+1}^D = 0$$

is the best, and it is important to reduce the value as much as possible even if it is not 0. Next, it is important to induce the use of the battery as little as possible when $$e_{t+1}^D = 0.$$

This is because the energy loss occurs due to the battery charging and discharging efficiency ($\eta_c$, $\eta_d$), and the lifespan decreases as the battery is used due to the battery deterioration. Accordingly, a charge/discharge penalty ($\beta_c$, $\beta_d$) was set. Since the priority is to make $$e_{t+1}^D = 0,$$

it is better to set the charge/discharge penalty ($\beta_c$, $\beta_d$) to a value greater than 0 and much smaller than 1.

Ultimately, the objective function is expressed as Equation (1). It is to determine the forecasted value $$\{a_t\}_{t=0}^{\infty}$$

that may minimize the sum of the error function $$f_{t+1}^D$$

according to a distribution of future renewable energy generation amount $$\{x_{t+1}\}_{t=0}^{\infty}.$$

In this regard, the meaning of depreciation ($0<\gamma<1$) is that the more distant future an error occurs, the less important it is. The reason that all future errors must be considered is that time-coupling occurs due to Equation (4).

Hereinafter, an error compensable forecasting algorithm used in an embodiment of the present disclosure will be described.

If the distribution of $$\{x_{t+1}\}_{t=0}^{\infty}$$

is known, it may be solved in an optimization way, but since the distribution is not known, a past data-based machine learning algorithm must be used. At this time, the fact that there is time-coupling due to Equation (4) means that a problem to be solved is sequential decision-making. Because the existing forecasting method focused on reducing the error $|a_t - x_{t+1}|$ without considering the battery, there was no time-coupling, so a supervised learning method was used. However, the sequential decision-making problem must use the Markov Decision Process (MDP)-based reinforcement learning algorithm.

MDP is modeled that when an agent takes a certain action ($a_t$) in a certain state ($s_t$) in the time zone t, the environment gives a reward ($r_{t+1}$) and the next state ($s_{t+1}$) in the next time zone t+1. At this time, following the Markov characteristic means that $r_{t+1}$ and $s_{t+1}$ are decided only by $s_t$ and $a_t$. That is, it is decided only by $s_t$ when the agent decides which action $a_t$ to take, and informing this is a policy $\pi$. The policy indicates a probability $\pi(a_t|s_t)$ that $a_t$ will be taken according to $s_t$. In this regard, a goal must not be to maximize $r_{t+1}$. Since $s_{t+1}$ is given along with $r_{t+1}$, all future rewards must be considered, so that $$\sum_{t=0}^{\infty} \gamma^t r_{t+1}$$

must be maximized. In this regard, $\gamma$ means the depreciation as above, and the more distant future the reward occurs, the lower the importance is.

In our model, the action $a_t$ that the agent has to decide is the forecasted value in the next time zone t+1 as defined above. The state $s_t$ and the reward $r_{t+1}$ are defined as below.

$$a_t = (x_t, E_t) \tag{8}$$

-continued $$s_t = (o_0, o_1, \ldots, o_t) \quad (9)$$

$$r_{t+1} = -f_{t+1}^D \quad (10)$$

The state $s_t$ has all the information necessary in the time zone t to determine $a_t$. Basically, information observable in the time zone t include renewable energy generation amount $x_t$ and the energy $E_t$ stored in the battery. However, there is insufficient information to determine $a_t$, only with $x_t$ and $E_t$. When the information observable in the time zone t are insufficient to determine $a_t$, the information are defined as an observed value $O_t$ that does not follow the Markov characteristic. The state may be regarded as having brought all the past information of the observed value $O_t$. In this regard, if exogenous variables such as weather are also available in the time zone t, the information may also be added to the observed value $O_t$.

The reward $r_{t+1}$ is determined by a purpose of the agent. As may be seen in Equation (1), since our goal is to minimize $$\sum_{t=0}^{\infty} \gamma^t f_{t+1}^D,$$

to utilize the purpose of reinforcement learning to maximize $$\sum_{t=0}^{\infty} \gamma^t r_{t+1},$$

it is defined as $$r_{t+1} = -f_{t+1}^D.$$

Reinforcement learning is divided into value-based reinforcement learning and policy-based reinforcement learning. Value-based reinforcement learning may be used when the action $a_t$ is discrete, but policy-based reinforcement learning must be used when the action $a_t$ is continuous. Our problem uses policy-based reinforcement learning because the action $a_t$ is the forecasted value and therefore continuous. Policy-based reinforcement learning finds a parameter $\theta$ that may maximize $$\sum_{t=0}^{\infty} \gamma^t r_{t+1}$$

by modeling the policy $\pi$ as the parameter $\theta$ (referred to as a policy $\pi_\theta$ this time).

The detailed description of the model including the parameter $\theta$ is as follows. First, an input to the model is the state $s_t$. In this regard, when the state includes time series data as in Equation (9), time series information may be obtained by using an LSTM model. The output of the model is a policy $\pi_\theta(\cdot|s_t)$ in the state $s_t$. In general, it is modeled as a Gaussian distribution and outputs the average of the Gaussian distribution. The standard deviation of the Gaussian distribution is set as a hyperparameter and adjusted during a model training process. The action $a_t$ is extracted from the policy $\pi_\theta(\cdot|s_t)$.

If Equation (1), which is the problem we need to solve, is changed into reinforcement learning form, it is as follows.

$$\underset{\{a_t\}_{t=0}^{\infty}}{\text{minimize}}\ \mathbb{E}_{\{x_{t+1}\}_{t=0}^{\infty}}\left[\sum_{t=0}^{\infty} \gamma^t f_{t+1}^D\right] = \underset{\theta}{\text{maximize}}\ \mathbb{E}_{\{x_{t+1}, a_t\}_{t=0}^{\infty}}\left[\sum_{t=0}^{\infty} \gamma^t r_{t+1}\right] \quad (11)$$

where $$a_t \sim \pi_\theta(.\,|\,s_t) \quad (12)$$

In Equation (1), since the objective function is $$f_{t+1}^D,$$

"minimize" must be replaced with "maximize" in the objective function $r_{t+1}$. Also, if the policy $\pi_\theta$ is determined, the action may be output by inputting only the state $s_t$ for each time zone, and thus, determining $$\{a_t\}_{t=0}^{\infty}$$

may be replaced with determining $\theta$. Therefore, Equation (1) and Equation (11) may be regarded as being equivalent. Since Equation (11) is a general expression used in policy-based reinforcement learning, $\theta$ may be determined by directly applying the reinforcement learning algorithm.

All policy-based reinforcement learning algorithms that may control continuous values are applicable. Typically, there are the following algorithms.

1 Deep Deterministic Policy Gradient (DDPG)
2 Asynchronous Advantage Actor Critic (A3C)
3 Actor Critic with Experience Replay (ACER)
4 Trust Region Policy Optimization (TRPO)
5 Proximal Policy Optimization (PPO)
6 Soft Actor Critic (SAC)

Each algorithm has its pros and cons, but PPO and SAC are the most used these days. Compared to the other algorithms, PPO has the advantage of being capable of relatively quick and accurate learning, and SAC is known to show the best performance among the above six algorithms. Because a forecasting model is often updated periodically, it is recommended to use PPO.

In addition, the conventional model may be used as it is without having to reconfigure a new model. This is because, in the conventional model, only the energy $E_t$ stored in the battery needs to be added to the input. Adding the information E't to the input of the conventional model becomes the state $s_t$, and the output of the conventional model becomes the Gaussian average of the policy $\pi_\theta(\cdot|s_t)$.

Figure 2:
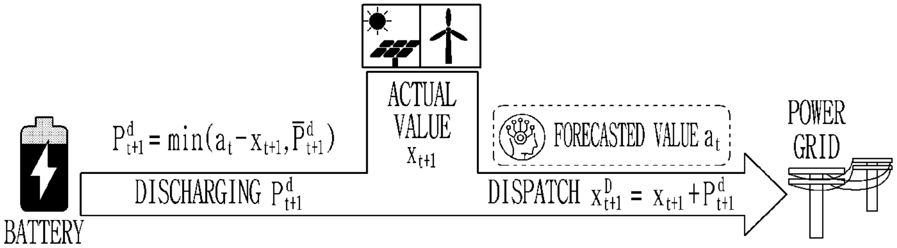

FIGS. 1 and 2 are diagrams for explaining a battery operating method.

Referring to FIG. 1, when the measured value $x_{t+1}$ is greater than the forecasted value $a_t$, an error may be compensated by charging the battery by $x_{t+1}-a_t$, but is limited to $$\overline{P}_{t+1}^c,$$

due to a restriction of battery capacity, maximum input power, etc. A value obtained by subtracting the amount of charge $$P^c_{t+1}$$

from the measured value $x_{t+1}$ becomes the dispatched amount $$x^D_{t+1}.$$

If the limit $$\overline{P}^c_{t+1}$$

is not reached, since $$P^c_{t+1} = x_{t+1} - a_t,$$

$$x^D_{t+1} = a_t.$$

Next, referring to FIG. 2, when the measured value $x_{t+1}$ is smaller than the forecasted value $a_t$, the error may be compensated by discharging the battery by $$\overline{P}^c_{t+1},$$

but is limited to $$\overline{P}^d_{t+1}$$

due to a restriction of the energy remaining in the battery, the maximum output power, etc. A value obtained by adding the amount of charge $$P^d_{t+1}$$

to the measured value $x_{t+1}$ becomes the dispatched amount $$x^D_{t+1}.$$

If the limit $$\overline{P}^d_{t+1}$$

is not reached, since $$P^d_{t+1} = a_t - x_{t+1},\ x^D_{t+1} = a_t$$

Figure 3:
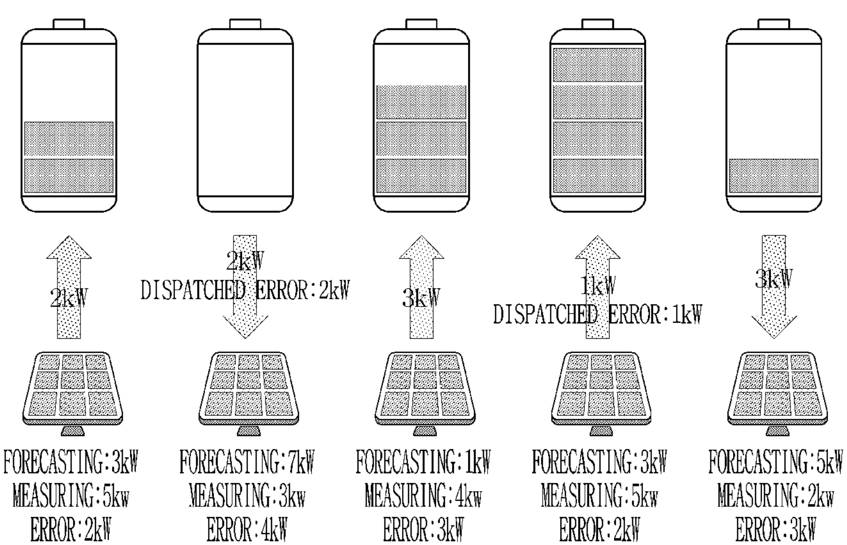
FIG. 3 is a diagram for explaining an example of a battery operation for error compensation.

FIG. 3 is a diagram for explaining an example of a battery operation for error compensation.

Referring to FIG. 3, when a measured value is greater than a forecasted value, a battery is charged as much as an error, and in the opposite case, the battery is discharged. When energy stored in the battery is insufficient, the battery may not be discharged as much as necessary, and on the contrary, when the battery is almost full, the battery may not be charged as much as necessary, which causes a dispatched error. At this time, it may be seen that reducing the forecasting error does not reduce the dispatched error. In the first case and the fourth case, the forecasting error is the same as 2 kW, but in the first case, there is no dispatched error, and in the fourth case, there is the dispatched error. Also, in the third and fifth cases, the forecasting error was 3 KW, which was greater than the fourth case, but the dispatched error was 0, which was smaller than the fourth case. In other words, it indicates the importance of making a compensable error rather than reducing an error.

Figure 4:
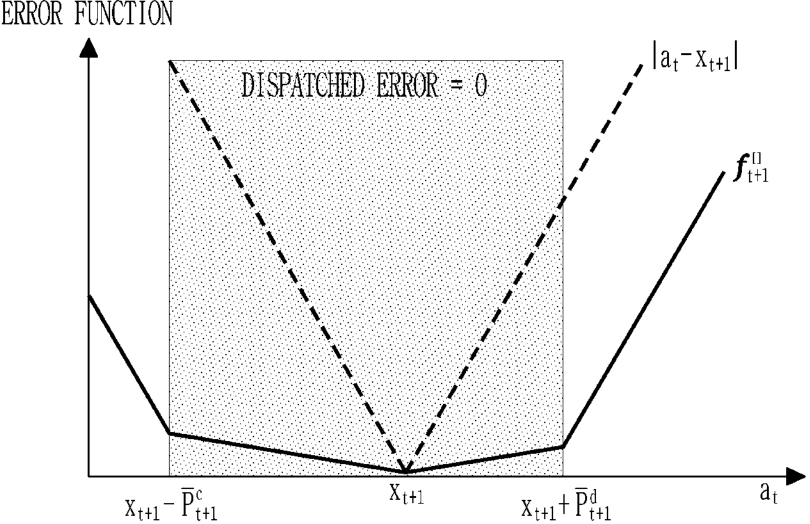
FIG. 4 is a graph illustrating a comparison between a conventional error function and an error function according to an embodiment of the present disclosure.

FIG. 4 is a graph illustrating a comparison between a conventional error function and an error function according to an embodiment of the present disclosure.

Referring to FIG. 4, the conventional error function $|a_t - x_{t+1}|$ and the proposed error function $$f^D_{t+1}$$

are compared. In order to make the dispatched error $$e^D_{t+1}$$

as 0, the forecasted value $a_t$ must be between $$x_{t+1} - \overline{P}^c_{t+1}$$

and $$x_{t+1} + \overline{P}^d_{t+1}.$$

In $$f^D_{t+1},$$

an inclination is low in a section where the dispatched error is 0, and the inclination is increased when the dispatched error is not 0. To the contrary, in $|a_t - x_{t+1}|$, since the inclination is always constant, it is not considered whether the dispatched error is 0 or not.

Figure 5:
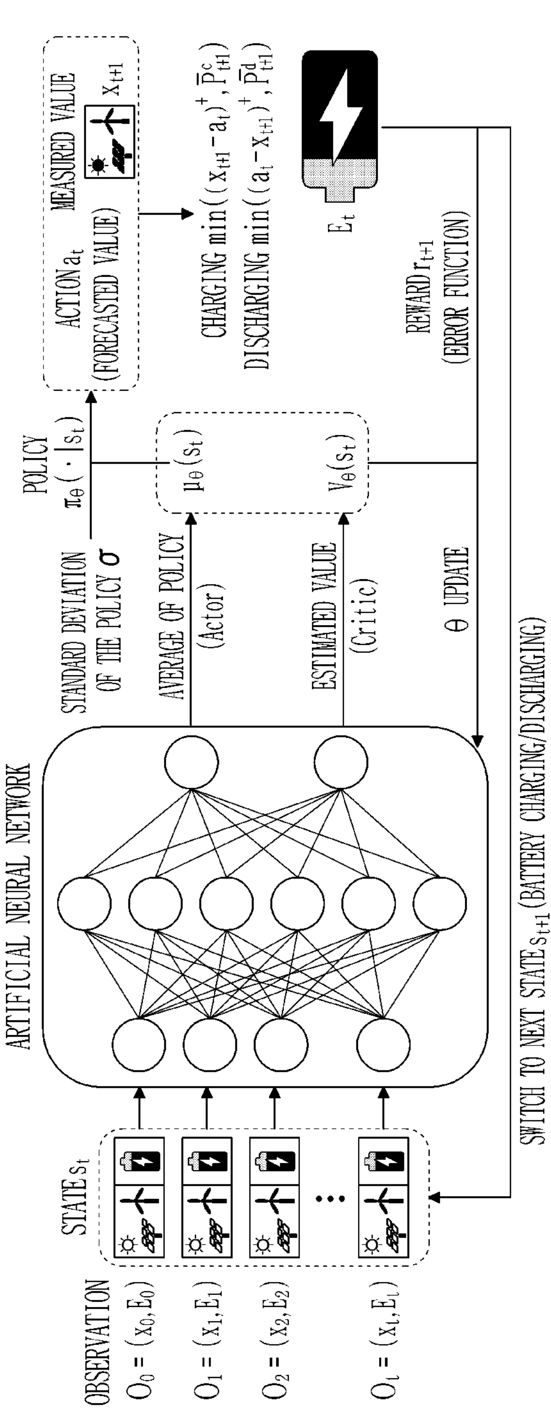
FIG. 5 is a diagram for explaining reinforcement learning-based error compensable forecasting algorithm according to an embodiment of the present disclosure.

FIG. 5 is a diagram for explaining a reinforcement learning-based error compensable forecasting algorithm according to an embodiment of the present disclosure.

Referring to FIG. 5, if the state $s_t$ including past observed values is input to the model including the parameter $\theta$, the average of the policy $\pi_\theta$ is output. This generates the Gaussian distribution like the standard deviation of the policy set as a hyperparameter, and the action $a_t$ is extracted from the distribution. Another output $V_\theta(s_t)$ of the model is an estimated value function, which is used to update the model. After compensating for the forecasting error by charging and discharging the battery, compensation is determined using the error function. The model is updated with the compensation and the estimated value function, and a next state is determined with a value after charging and discharging the battery and the measured value $x_{t+1}$.

Figure 6:
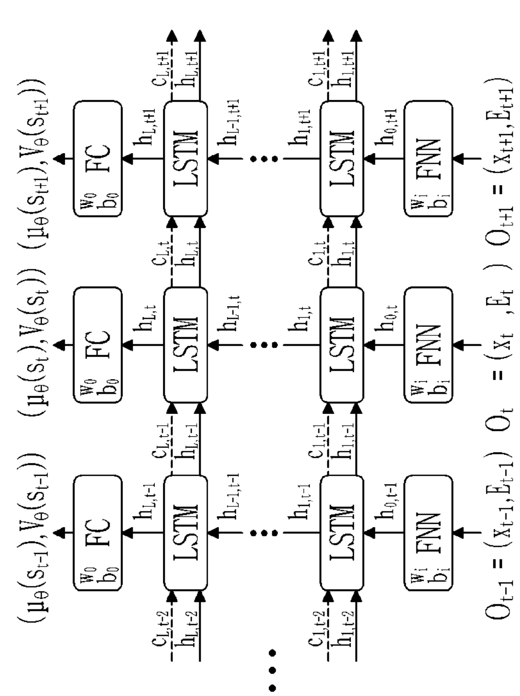
FIG. 6 is a diagram for explaining an LSTM model used for error compensable forecasting algorithm according to an embodiment of the present disclosure.
Figure 6:
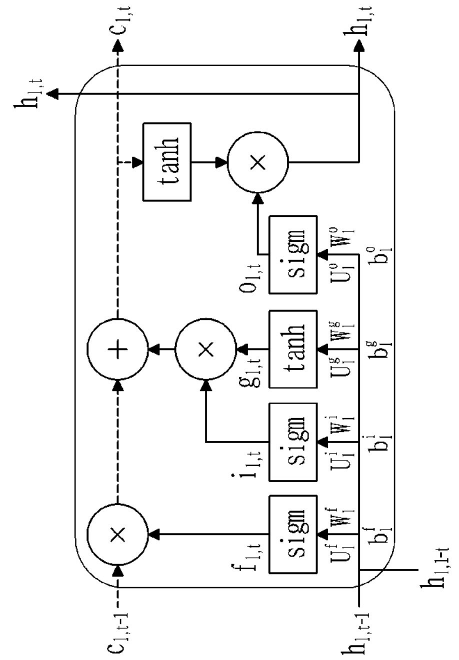

FIG. 6 is a diagram for explaining an LSTM model used for error compensable forecasting according to an embodiment of the present disclosure.

Referring to FIG. 6, since information in the time zone t−1 is transmitted to the time zone t, it may be seen that all observed values $o_0$, $o_1$; . . . ; $o_t$ in the time zone t are used. It may be seen that in the conventional forecasting model, $E_t$ and $V_\theta(s_t)$ are respectively added to the input and the output, and in the more advanced LSTM model, if $E_t$ and $V_\theta(s_t)$ are respectively added to the input and output, the model may be used as it is.

Figure 7:
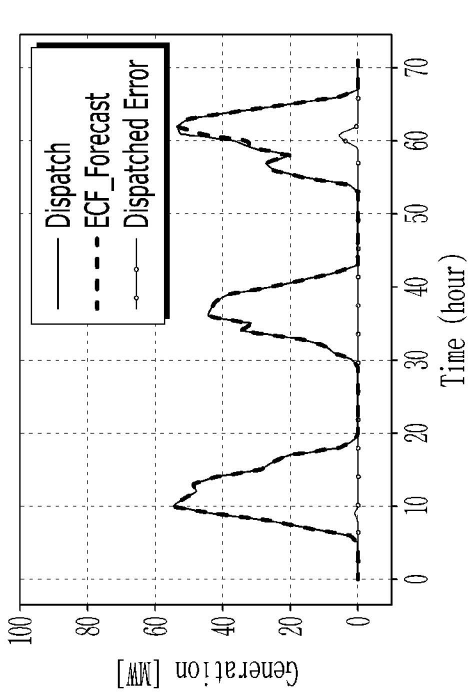
FIG. 7 is a graph illustrating a comparison of forecasting results of the conventional art and forecasting results obtained from embodiments of the present disclosure with respect to solar forecasting which is one of renewable energies.
Figure 7:
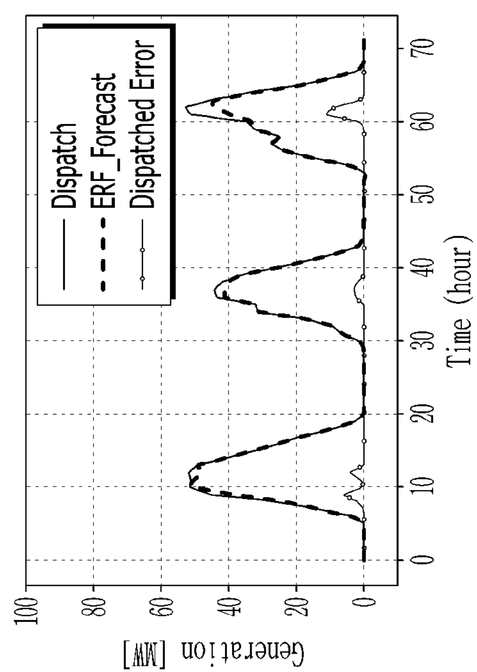

FIG. 7 is a graph illustrating a comparison of forecasting results of the conventional art and forecasting results obtained from embodiments of the present disclosure with respect to solar forecasting which is one of renewable energies.

Referring to FIG. 7, the conventional art is named error reduction forecasting (EFR) because its purpose is to reduce the error, its goal is to reduce the mean square error of $a_t$ and $x_{t+1}$, and its proposed technology is error compensable forecasting (ECF). ERF and ECF are different from each other because the dispatched value $$x_{t+1}^{D}$$

is determined by the value $a_t$ forecasted in the previous time zone t. Since ERF also reduces the forecasting error, the dispatched error may be made 0 in many cases, whereas it may be seen that ECF makes the dispatched error as 0 at a much higher frequency than ERF, and even when the dispatched error is not 0, an error value of ECF is much smaller than that of ERF.

Figure 8:
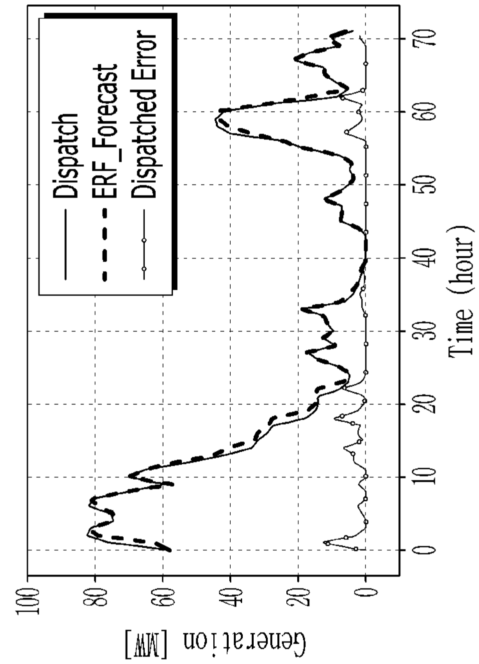
FIG. 8 is a graph illustrating a comparison of forecasting results of the conventional art and forecasting results obtained from embodiments of the present disclosure with respect to forecasting of wind power, which is one of renewable energies.

FIG. 8 is a graph illustrating a comparison of forecasting results of the conventional art and forecasting results obtained from embodiments of the present disclosure with respect to forecasting of wind power, which is one of renewable energies.

Referring to FIG. 8, as in solar forecasting, it can be seen that ECF makes the dispatched error as 0 at a much higher frequency than ERF, and even when the dispatched error is not 0, the error value of ECF is much smaller than that of ERF.

Figure 9:
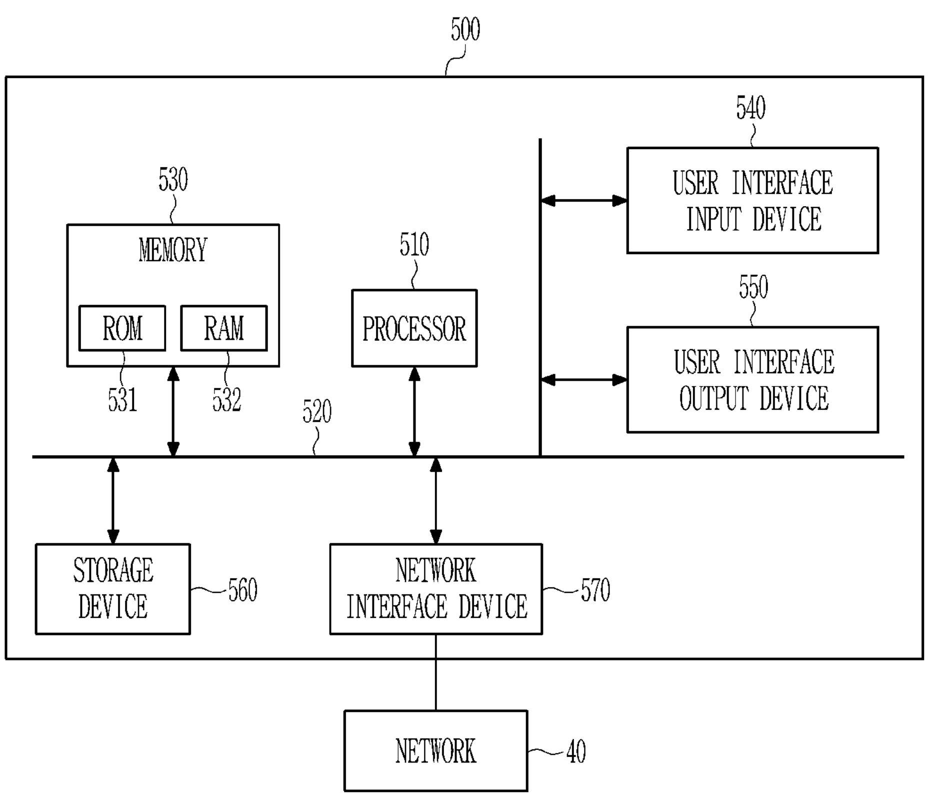
FIG. 9 is a block diagram illustrating a computing device for implementing a renewable energy error compensable forecasting method using a battery according to embodiments of the present disclosure.

FIG. 9 is a block diagram illustrating a computing device for implementing a renewable energy error compensable forecasting method using a battery according to embodiments of the present disclosure.

Referring to FIG. 9, the renewable energy error compensable forecasting method using the battery according to embodiments of the present disclosure may be implemented using a computing device 500.

The computing device 500 may include at least one of a processor 510, a memory 530, a user interface input device 540, a user interface output device 550, and a storage device 560 that communicate via a bus 520. The computing device 500 may also include a network interface 570 electrically connected to a network 40, such as a wireless network. The network interface 570 may transmit or receive signals with other entities through the network 40.

The processor 510 may be implemented in various types such as an application processor (AP), a central processing unit (CPU), a graphic processing unit (GPU), etc., and may be an arbitrary semiconductor device that executes a command stored in the memory 530 or the storage device 560. The processor 510 may be configured to implement the functions and methods described with reference to FIGS. 1 to 8.

The memory 530 and the storage device 560 may include various types of volatile or non-volatile storage media. For example, the memory may include a read-only memory (ROM) 531 and a random access memory (RAM) 532. In an embodiment of the present disclosure, the memory 530 may be located inside or outside the processor 510, and the memory 530 may be connected to the processor 510 through various known means.

In addition, at least some of the method and system for forecasting solar power generation amount according to embodiments of the present disclosure may be implemented as a program or software executed in the computing device 500, and the program or the software may be stored in a computer-readable medium.

In addition, at least some of the method and system for forecasting solar power generation amount according to embodiments of the present disclosure may be implemented as hardware capable of being electrically connected to the computing device 500.

According to the embodiments of the present disclosure described above, an algorithm that ultimately minimizes the error (the dispatched error) between the forecasted value and the dispatch value sent to the power grid, by switching the goal of renewable energy forecasting from reducing the error to making the compensable error was adopted, and is an algorithm that requires interaction with the battery unlike the existing forecasting, and thus the existing deep learning-based forecasting was extended to a deep reinforcement learning-based forecasting for continuous value control, thereby showing the possibility of implementing error compensable forecasting.

Amid the flow of technology that attempt to mitigate the uncertainty and volatility of renewable energy through the battery, there has been no movement to attempt forecasting that makes the "compensable error" through the battery. From the point of view of a power grid operator, since a fatal error for a stable power grid operation is not the error between the measured value and the forecasted value, but the error (the dispatched error) between the dispatch value sent to the power grid and the forecasted value, the forecasting error compensation is very important. There is an advantageous effect of greatly reducing the dispatched error finally by making the forecasting error compensable, rather than simply reducing the forecasting error as in the conventional art.

In addition, the embodiments of the present disclosure additionally apply only the reinforcement learning algorithm that allows interaction with the battery while utilizing the conventional deep learning structure that greatly reduces the forecasting error, which means that, while absorbing the advantages of the conventional art as it is, it is possible to secure the possibility and ease of implementing the error compensable forecasting.

Although the embodiments of the present disclosure have been described in detail above, the scope of the present disclosure is not limited thereto. Various modifications and improvements by those ordinary skill in the art using the basic concept of the present disclosure defined in the following claims also fall within the scope of the present disclosure.

What is claimed is:

1. A renewable energy error compensable forecasting method using a battery comprising:

modeling a policy $\pi_\theta$ with a parameter θ, by using a reinforcement learning algorithm in which a state $s_t$ of an agent in a time zone, and, a reward $r_{t+1}$ in a time zone t+1 and a next state $s_{t+1}$ with respect to an action $a_t$ taken by the agent are determined;

determining the parameter θ for minimizing a sum of an error function $$f_{t+1}^D;$$

ana generating a compensable error with the battery using a model including the parameter θ; and charging or discharging the battery based on the compensable error.

2. The renewable energy error compensable forecasting method of claim 1, wherein the charging or discharging the battery based on the compensable error comprises charging the battery by the compensable error in case of under-forecasting.

3. The renewable energy error compensable forecasting method of claim 1, wherein the charging or discharging the battery based on the compensable error comprises discharging the battery by the compensable error in case of over-forecasting.

4. The renewable energy error compensable forecasting method of claim 1, wherein:

the state s: is determined using Equation 1 below, $$s_t = (o_0, o_1, \ldots, o_t) \quad \text{[Equation 1]}$$

(here, $o_t$ denotes an observed value in the time zone t).

5. The renewable energy error compensable forecasting method of claim 4, wherein:

the observed value $O_t$ is determined using Equation 2 below, $$o_t = (x_t, E_t) \quad \text{[Equation 2]}$$

(here, $x_t$ denotes a measured value of renewable energy generation amount in the time zone t, and $E_t$ denotes energy stored in the battery).

6. The renewable energy error compensable forecasting method of claim 1, wherein:

the reward $r_{t+1}$ is determined using Equation 3 below, $$r_{t+1} = -f_{t+1}^D \quad \text{[Equation 3]}$$

(here, $$f_{t+1}^D$$

denotes an error function).

7. The renewable energy error compensable forecasting method of claim 1, wherein:

an objective function of the reinforcement learning algorithm is determined using Equation 4 below,

[Equation 4]

$$\underset{\{a_t\}_{t=0}^{\infty}}{\text{minimize}}\ \mathbb{E}_{\{x_{t+1}\}_{t=0}^{\infty}}\left[\sum_{t=0}^{\infty}\gamma^t f_{t+1}^D\right] = \underset{\theta}{\text{maximize}}\ \mathbb{E}_{\{x_{t+1},a_t\}_{t=0}^{\infty}}\left[\sum_{t=0}^{\infty}\gamma^t r_{t+1}\right]$$

(here, $$\{a_t\}_{t=0}^{\infty}$$

denotes a forecasted value for minimizing the sum of the error function $$f_{t+1}^D,$$

γ denotes a depreciation (0<γ<1), and $$\{x_{t+1}\}_{t=0}^{\infty}$$

denotes a future renewable energy generation amount).

8. The renewable energy error compensable forecasting method of claim 7, wherein:

the action $a_t$ is extracted $\pi_\theta(\cdot|s_t)$ corresponding to the policy in the state $s_t$.

9. The renewable energy error compensable forecasting method of claim 1, wherein:

the reinforcement learning algorithm is implemented using an artificial neural network model.

10. The renewable energy error compensable forecasting method of claim 9, wherein:

the artificial neural network model updates the parameter θ by using a value function $V_\theta(s_t)$ estimated from the state $s_t$ of the agent in the time zone t.

* * * * *